United States Patent
Ostrup et al.

(10) Patent No.: US 7,093,010 B2
(45) Date of Patent: Aug. 15, 2006

(54) OPERATOR-DEFINED CONSISTENCY CHECKING IN A NETWORK MANAGEMENT SYSTEM

(75) Inventors: Nils Peter Ostrup, Linköping (SE); Jesper Hök, Täby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 749 days.

(21) Appl. No.: 10/150,495

(22) Filed: May 20, 2002

(65) Prior Publication Data
US 2003/0217133 A1    Nov. 20, 2003

(51) Int. Cl.
*G06F 15/173* (2006.01)

(52) U.S. Cl. .................. 709/223; 709/220; 709/221; 709/224

(58) Field of Classification Search ........ 709/220–221, 709/223–224
See application file for complete search history.

(56) References Cited

U.S. PATENT DOCUMENTS

| | | | |
|---|---|---|---|
| 5,175,800 A | | 12/1992 | Galis et al. |
| 5,414,812 A | | 5/1995 | Filip et al. |
| 5,838,918 A | * | 11/1998 | Prager et al. ............... 709/221 |
| 5,872,928 A | | 2/1999 | Lewis et al. |
| 5,964,837 A | * | 10/1999 | Chao et al. ................. 709/224 |
| 6,223,219 B1 | * | 4/2001 | Uniacke et al. ............. 709/223 |
| 6,259,679 B1 | * | 7/2001 | Henderson et al. ......... 370/254 |
| 6,366,789 B1 | * | 4/2002 | Hildebrand ................. 455/561 |
| 6,397,247 B1 | * | 5/2002 | Shirakawa et al. ......... 709/223 |
| 6,449,641 B1 | * | 9/2002 | Moiin et al. ................ 709/220 |
| 6,449,715 B1 | * | 9/2002 | Krivoshein .................... 713/1 |
| 6,597,666 B1 | * | 7/2003 | Hemzal et al. .............. 370/254 |
| 6,603,983 B1 | * | 8/2003 | Hildebrand ................. 455/561 |
| 6,877,051 B1 | * | 4/2005 | Iwanojko et al. ........... 710/100 |
| 6,934,749 B1 | * | 8/2005 | Black et al. ................ 709/224 |
| 2002/0019864 A1 | * | 2/2002 | Mayer ........................ 709/223 |
| 2003/0101357 A1 | * | 5/2003 | Ronen et al. ............... 713/201 |
| 2003/0177412 A1 | * | 9/2003 | Todd ............................. 714/25 |

FOREIGN PATENT DOCUMENTS

DE    198 13 754    9/1999

OTHER PUBLICATIONS

Hosoon Ku, et al. "Web-Based Configuration Management Architecture for Router Networks," Ericsson Inc., Datacon Networks and IP Services, XP010376682.
International Search Report PCT/SE03/00758 dated Jul. 31, 2003.

* cited by examiner

*Primary Examiner*—Saleh Najjar
*Assistant Examiner*—Faruk Hamza
(74) *Attorney, Agent, or Firm*—Nixon & Vanderhye P.C.

(57) ABSTRACT

A flexible consistency checking mechanism allows network operators to create their own consistency checking rules. Several consistency check formulas are provided. Each formula defines one or more general operations on one or more managed network objects. By applying a general consistency check formulas to one or more specific managed network objects, one or more consistency check rules is generated. For example, the user can generate the consistency check rules simply by inputting certain data values for formula variables by way of a user interface. Once those rules have been generated, they can be used to check the consistency of one or more aspects of a communications network configuration. Each formula also may include a checkpoint that defines a time period or event when a corresponding consistency check rule established using that formula should be executed.

22 Claims, 6 Drawing Sheets

OPERATOR-DEFINED CONSISTENCY CHECKING IN A NETWORK MANAGEMENT SYSTEM

FIELD OF THE INVENTION

The present invention relates to operation and maintenance of a telecommunications network, and more particularly, to configuration management and consistency checking for such a network.

BACKGROUND AND SUMMARY OF THE INVENTION

Today's communication networks are large, and the number of resources and services provided is increasing. Network equipment often comes from different vendors, and network operators use a variety of different operations and management systems to manage their networks. Each vendor's equipment often has its own management system, and different services in the network are controlled in different ways. All of these factors increase the complexity and cost for operations and maintenance.

One way to simplify that complexity and reduce the cost for network operators is to develop an international standard on how telecommunications networks will be managed in a uniform and efficient way. For example, the Third Generation Partnership Project (3GPP) is developing standards for the third generation (3G) of mobile communications systems. The standard documents 3GPP TS 32.101-102 describe various 3G management principles and architectures. Example management functions addressed in the 3GPP specifications include fault management, configuration management, performance management, roaming management, accounting, customer profile management, service deployment, fraud management, security management, and software management. The ITU Technical Specification Recommendation M.3100 is another management standard for telecom networks.

Notwithstanding these efforts at standardization, a mobile network operator may still have to manage many different types of networks, such as radio networks, exchanges, transmission networks, area networks, intelligent nodes, and substantial amounts of computer hardware/software. Because this wide variety of network equipment will likely be obtained from a variety of equipment vendors, effective configuration management is particularly critical in order to flexibly manage and adapt the topology and logical resources in the network.

Configuration management employs a Network Resource Model (NRM) to represent the actual managed telecommunication network resources. An NRM describes managed object classes, their associations, attributes, and operations. A Managed Object (MO) is a software object that encapsulates management characteristics and behavior of a particular network resource. The managed object is an "instance" of a "managed object class" defined in an NRM A managed object class has attributes that provide information used to characterize the objects that belong to the class. In addition, a managed object class can have operations that represent the behavior relevant for that class. An instance of a managed object class is sometimes called a "managed element." Associations are used to model relationships between managed objects and can be implemented in several ways, such as name bindings, reference attributes, and association objects. A management information base (MIB) is an instance of an NRM and includes a name space describing the managed object hierarchy in the MIB using distinguished names, a number of managed objects with their attributes, and a number of associations between these managed objects.

Part of the configuration management function in the network management system is to identify and eliminate inconsistencies in a network. A network may be represented in a valid configuration or in a planned network configuration. Typically, these configurations are "checked" for consistency using a large number of consistency check rules. Those rules represent best practices or desired practices regarding network configurations. For example, if a radio base station is to be added to a network, consistency check rules might ensure that the new base station is configured with a unique identifier, appropriate radio channels, and particular transmit power levels. The consistency check rules are usually quite voluminous, and all of them must be performed on every object in the configuration being checked. Consequently, when an operator initiates a consistency check after a system installation or a system restart, that check may take considerable time.

Indeed, hundreds of consistency check rules may have been developed and must be performed on all managed objects and their attributes in the configuration being checked. Such rules might check for the uniqueness of an identifier of a particular node, for a particular frequency range, for a maximum number of frequencies, for a maximum number of a particular type of channel, for maximum power levels, etc. Consider the example situation in a cellular network where a new cell D is going to be added to an existing configuration that already has cells A, B, and C with corresponding cell IDs. A consistency check is executed to ensure that the cell ID for cell D is not the same as any of the cell IDs already assigned to cells A, B, and C.

Consistency checks help the network operator avoid faulty attribute settings in a particular network configuration. Faulty settings would include, for example, attribute values that nodes within a network will not accept or values that would degrade the system characteristics and functionality within a node or between nodes. Because consistency checks of attribute settings is primarily performed before attributes are set in the network, most consistency checks are executed in a planned configuration, referred to hereafter as a "planned area." However, since inconsistencies may be present in actually configured networks, consistency checks can also be performed on a live network, referred to hereafter as a "valid area."

A network operator is usually provided with a very long list of pre-coded, consistency check rules. Again, it is not uncommon for a network operator to have to select from a list of hundreds of such pre-coded rules when a particular consistency check is to be performed on a planned area or active area configuration. Although all of the consistency check rules may be selected, it may be that the network operator only wants to use some of those rules rather than all of them. This is especially true given the amount of time it takes to execute a large number of such rules. Alternatively, operators may want to create their own consistency check rules other than or in addition to those on the pre-coded list. In this case, the network operator must go back to the management system vendor who supplied the original management system software with the pre-coded consistency check rules and ask the vendor to code new consistency check rules. Of course, time and money are required to develop such software upgrades.

It is therefore desirable for network operators to have the flexibility to create consistency check rules without having to re-code the management software or request a software upgrade from a network management software vendor. It is also desirable to provide the network operator with some choice as to when a consistency check rule is executed. As an example, when "populating" a planned area, the integrity of the populating data could be high because it was created automatically. This means that consistency checking of this populating data could be done only when a change of the data is made directly in the valid area. The integrity of other populating data (e.g., manually created) could be lower, and thus, the consistency check should be done either at population of the planned area or when upgrading the valid area. The network vendor has little or no knowledge about the integrity of the populating data before it populates the planned area, which is why the decision of when to perform consistency checking lies best with the operator of the network. Pre-coded consistency check rules do not provide operators with this option.

The present invention overcomes these shortcomings by providing a flexible consistency checking mechanism that allows network operators to generate their own consistency checking rules using a consistency check rule making/editing functionality. In a preferred example embodiment, several basic consistency check formulas are provided. Each formula defines one (or more) general operations performed on one or more managed network objects. By applying the general consistency check formulas to one or more specific managed network objects, one or more consistency check rules is created. The user can create the consistency check rules simply by inputting certain data values for formula variables by way of a user interface or file transfer. Once those rules have been created, they can be used to check the consistency of one or more aspects of a communications network configuration, either in a planned area or a valid area. Because the formulas are general, a single formula can be used to generate multiple consistency check rules using different managed objects and attributes.

Another advantageous aspect of the present invention is that each consistency check formula may include a "checkpoint" which defines a time period or an event when a corresponding consistency check rule established using that formula should be executed. In other words, when an operator uses one of the formulas to define a new consistency check rule, the operator also connects or otherwise associates that new consistency check rule to a particular checkpoint or event when rule execution is to occur. Examples of possible checkpoints in a cellular network context include immediate creation of a cell, activation of a cell, creation of a location area, import of new data to the network management system from an external management system, i.e., the planned area check, and an initial start of a network element or a management system. Of course, many other events may be defined as checkpoints.

As a result of the operator-defined consistency check functionality provided by the present invention, an operator will have the ability to create, delete, and change consistency check rules for a network without requiring a software upgrade or even assistance from a network management software vendor. Only those consistency check rules actually desired by the operator for a particular network area need be created. Moreover, the network operator will also be able to determine a time (and modify that time if desired) when a consistency check rule will be executed without requiring a software upgrade. This leads to shorter times in upgrading the operator's network with less time being spent doing consistency checking during population and validation of the planned area. The integrity of the data nonetheless remains high with consistency checking being performed when necessary.

BRIEF DESCRIPTION OF THE DRAWINGS

The foregoing and other objects, features, and advantages of the present invention may be more readily understood with reference to the following description taken in conjunction with the accompanying drawings.

DETAILED DESCRIPTION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details. For example, while the present invention is sometimes described in an example application to radio communications network, the present invention may be employed in any type of communications network.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
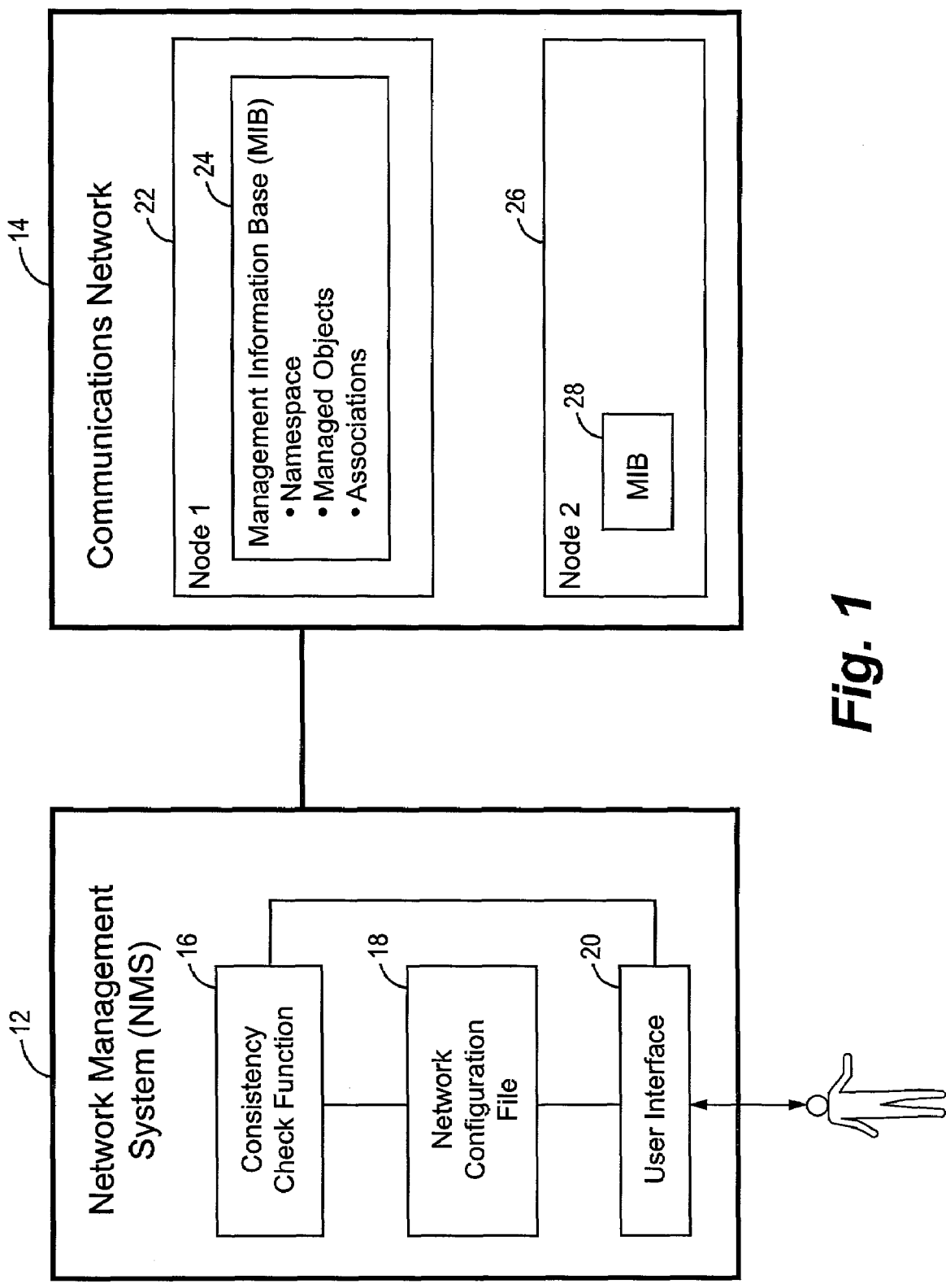
FIG. 1 illustrates a high level, function block diagram of a network management system including a consistency check function connected to a communications network.

FIG. 1 illustrates a simplified communication system 10 including a network management system (NMS) 12 coupled to a communications network 14. The network management system 12 includes, (among other functions), a consistency check function 16 coupled to a network configuration file 18, which is coupled to a user interface 20. A network operator employs the user interface 20 to set up, transfer, or store in the network configuration file 18 configuration data, (e.g., a planned configuration area and/or a valid configuration as described above), to be checked for consistency by the consistency check function 16. The user interface 20 may be, for example, a graphical user interface. The user interface is also used by a network operator to create specific consistency check rules using general consistency check formulas provided by the consistency check function 16. Those skilled in the art will recognize that the functions performed by or using each of the consistency check function 16, network configuration file 18, and user interface 20 are implemented using suitable hardware and software.

The example communications network 14 includes plural nodes 22 and 26 (only two are shown). Each node includes a management information base (MIB) 24 and 26. Each management information base includes a name space, managed objects, and associations as described in the background section above. Before the valid area configuration in the network configuration file 18 is loaded to the communication network nodes 22 and 26, the consistency check function 16 executes all consistency check rules at their respective checkpoints. The check avoids the use of inconsistent data which could lead to failure in or the degradation of systems characteristics in the communications network nodes 22 and 26.

Figure 2:
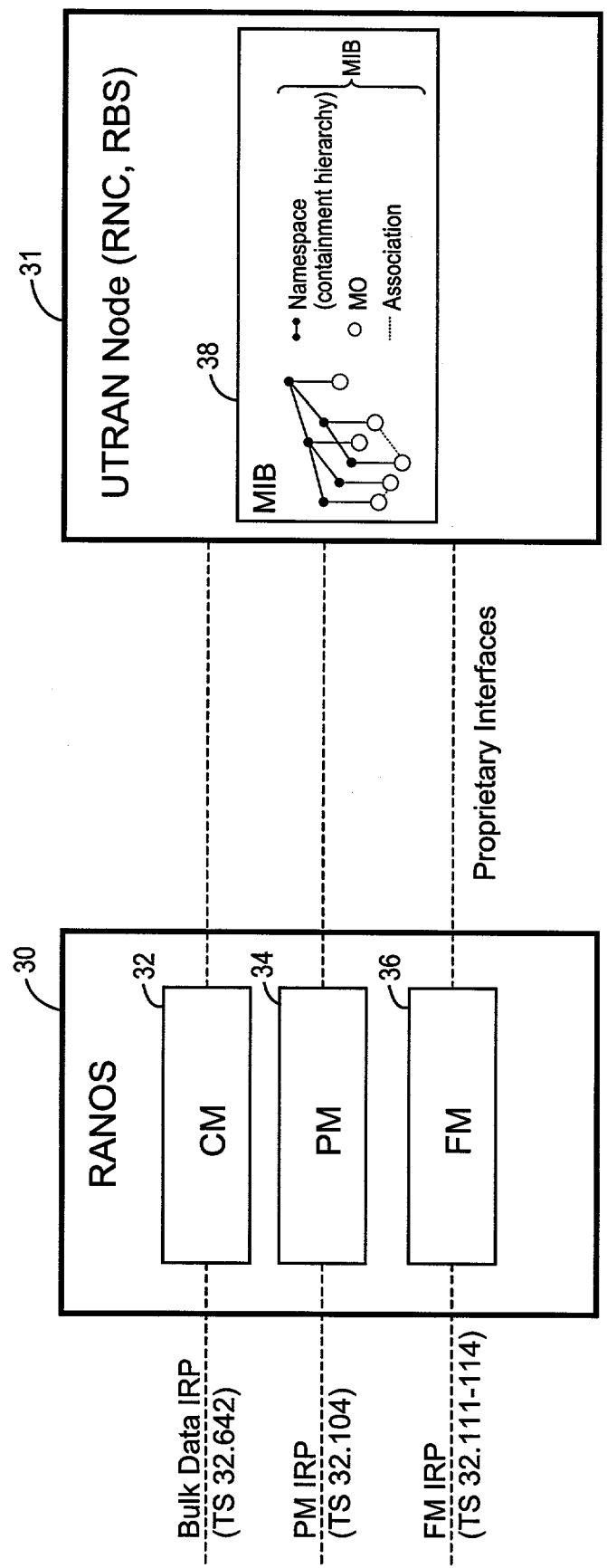
FIG. 2 illustrates an example network management system in the non-limiting example of a radio access communications network.

FIG. 2 illustrates a specific, non-limiting example of a network management system in the context of a radio access communications network. For example, the assignee of the instant invention sells a Radio Access Network Operation Support (RANOS) node 30 that includes a software configuration manager (CM) 32, a software performance manager (PM) 34, and software fault manager (FM) 36 to implement various network management and support operations. Data to be configured can be transferred to the configuration manager 32 via a bulk data Integration Reference Point (IRP) in accordance with 3GPP Technical Specification 32.642. An IRP describes the information flow and support objects for a certain functional area which, in the case of the CM 32, is network configuration information. In the case of the FM IRP, such as defined by 3GPP TS 32.111-114, the IRP might include an alarm information service with alarm information or an alarm list. Similarly, a performance management IRP is shown corresponding to 3GPP TS 32.104. A network node 31 in a UMTS terrestrial radio access network (UTRAN) is illustrated. Examples of a UTRAN node 31 include a radio network controller (RNC) and a radio base station (RBS). Each node is defined by a corresponding management information base (MIB) 38. The interface between RANOS and the UTRAN Node(s) is proprietary. If the interface is standardized, the consistency check on node specific data could be performed in the network node(s) and thus, speed up the time for a network wide update. However, this might lead to iconsistencies being detected later in the process.

Figure 3:
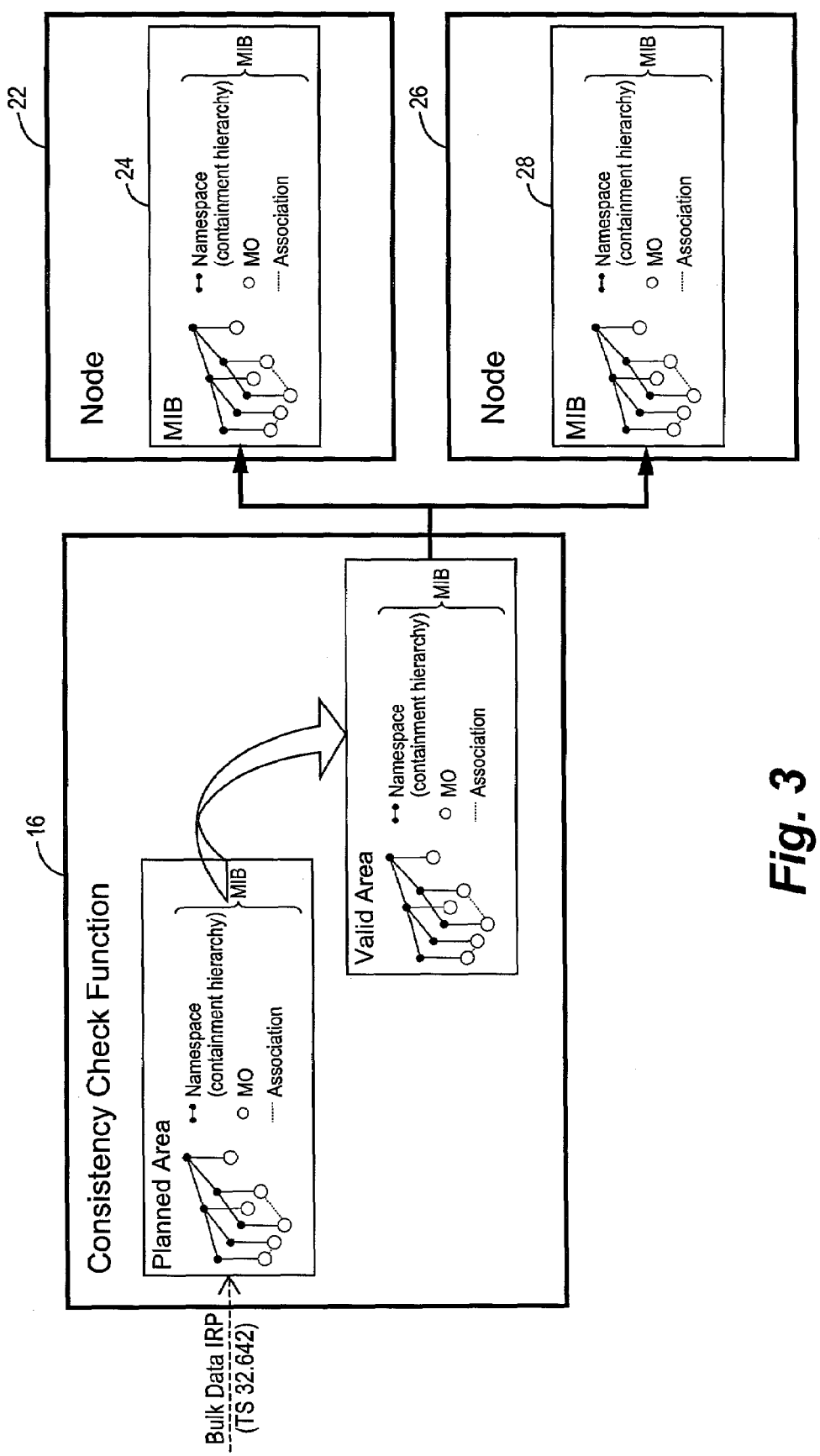
FIG. 3 illustrates an example of a configuration management function for various communications network nodes using a planned configuration area formatted in management information base (MIB) style.

The present invention relates to the consistency check function 16 shown in FIG. 1 in the network management system 12. FIG. 3 illustrates an example of a consistency check function 16 performing a consistency check on configuration data received over a bulk data IRP (see 3GPP TS 32.642) in the form of a planned area. An example of a planned area might be a new set of nodes 22 and 26 to be included, e.g., one or more RNCs and RBSs, to an existing network, e.g., a UTRAN. Once the planned area is found to be consistent, it is validated. The valid area is then used to configure the new nodes 22 and 26. The configured consistency check rules are used to check that the data received over the Bulk Data IRP is consistent at population or validation of the planned area. This ensures that the data downloaded to each node can safely be used in operation of the network node without any unwanted side effects. Some data might be changed manually, i.e., not through the Bulk Data IRP, in the planned or valid area. If specific data is changed manually as a normal procedure, the checkpoint for the consistency check rule checking this data should have been set to run the consistency check at the time of the manual change. The operator may also choose to run an immediate execution of a consistency check rule if something has been missed in the pre-processing of the data that was done before it was sent through the Bulk Data IRP.

Figure 4:
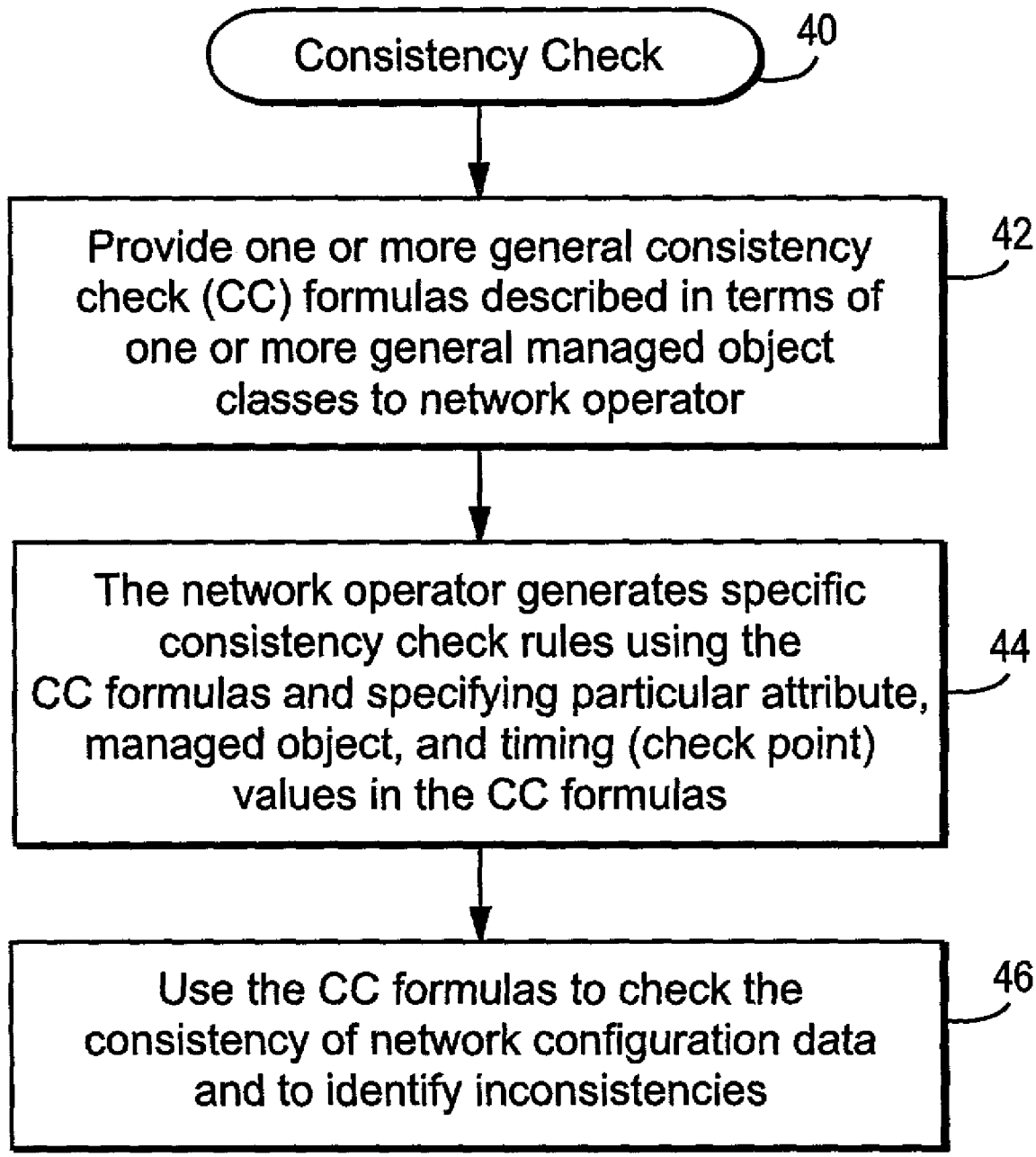
FIG. 4 illustrates consistency check procedures in accordance with one example embodiment of the present invention.

In order to provide the network operator with considerably improved flexibility as well as efficiency in terms of designing what consistency check rules are most useful to the network operator for performing a consistency check on a planned area, and when those consistency check rules should be executed, reference is now made to the Consistency Check routine (block 40) illustrated in flowchart form in FIG. 4. One or more general consistency check formulas, described in terms of one or more managed object classes, is provided to a network operator via a user interface or file transfer (block 42). The rules point out the objects. Examples of consistency check formulas are described below. The network operator creates specific consistency check rules for any planned or valid area using one or more of the consistency check formulas and specifies one or more particular attributes of one or more managed objects in those formulas. The operator is also invited to specify the time when the created consistency check rule should be executed. That time is specified using a checkpoint value in the consistency check formula (block 44). If the checkpoint is applied to one or more specific managed objects, the operator uses these managed objects to build the consistency check rules using the formulas. For example, when a cell is created, it could be the object used in one of the formulas requiring an object. Using the consistency check rules developed using the consistency check formula(s), the consistency check function 16 (FIG. 1) operates (as usual) to check the consistency of the configuration data (e.g., a planned area) and identify inconsistencies at the defined checkpoints (block 46).

A variety of consistency check formulas may be provided to a network operator. Several non-limiting examples of consistency check formulas with checkpoint conditions are provided below. A set of consistency check formulas make up a consistency check language.

Consistency check formula 1: Is [X] defined in the [Y] managed object instance of the [Z] configuration area?

X is an attribute of the Y managed object instance. Each Y managed object instance could be delivered when the checkpoint occurs in the Z planned/active configuration area. If the checkpoint event happens to a number of managed objects (one or more), these managed objects can be passed to the consistency check rule at the checkpoint. Examples include creation of a cell, creation of a cell relation (involves two cell objects), and connection of a cell to a location area (LA) (involves a cell object and an LA object).

Consistency check formula 2: Is [X] of the [Y] object instance unique within all [X] type attributes for all instances of [Y] type managed object classes of the [Z] area.

X is an attribute of the Y managed object instance. Each Y managed object sit; instance could be provided via the checkpoint Z. The operator could also choose to check the consistency of a specific attribute in a specific object and then run an immediate execution of the rule.

Consistency check formula 3: Is [X] of the [Y] managed object instance of the [Z] area within the [n] to [k] range?
    X is an attribute of the Y managed object instance. Each Y managed object instance could be delivered through the checkpoint Z, and n is a decimal number smaller than the decimal number k-1. n and k could also be defined as floating numbers.
Consistency check formula 4: In the [X] configuration area, does [Y] have a relation to [Z].
    Y and Z are managed object instances. Each object instance could be delivered through the checkpoint of the X configuration area.

These are only a few examples of consistency check formulas that may be defined in the consistency check language. However, from these four formulas, many of the typical, pre-coded consistency check rules may be generated.

When the operator defines a new consistency check rule using a consistency check formula, such as the formulas 1–4 above, network operators also may associate the new consistency check rule to a timing checkpoint. A checkpoint defines an event when the consistency check rule is executed. Examples of possible checkpoints include immediate execution, creation of a cell, activation of a cell, creation of a location area, import of new data to the network management system from an external management system (planned area check), and an initial start of a network element or a management system. Of course, many other events could be defined as checkpoints. For some checkpoints, a managed object instance will be delivered to the consistency check function so that a consistency check rule can use the delivered managed object instance specified by the consistency check formula used to create that consistency check rule. For example, when a cell is created, it must have a cell identity attribute specified, and this cell identity must be unique within the network. This means that the operator can define two consistency check rules according to formulas 1 and 2 above. At the checkpoint, "Creation of Cell," the operator chooses to define two rules. One uses the cell object as delivered by the checkpoint and then checks that the attribute "Cell Identity" is defined in this object at the checkpoint (formula 1). The second rule also uses the cell object delivered at the checkpoint and checks that no other cell object in the chosen configuration area has the same "Cell Identity" attribute value define. The "Cell Identity" attribute has yet another requirement: it has to have a value between 1 and 10000. This requirement could be consistency checked by adding a consistency check rule according to formula 3.

Figure 5:
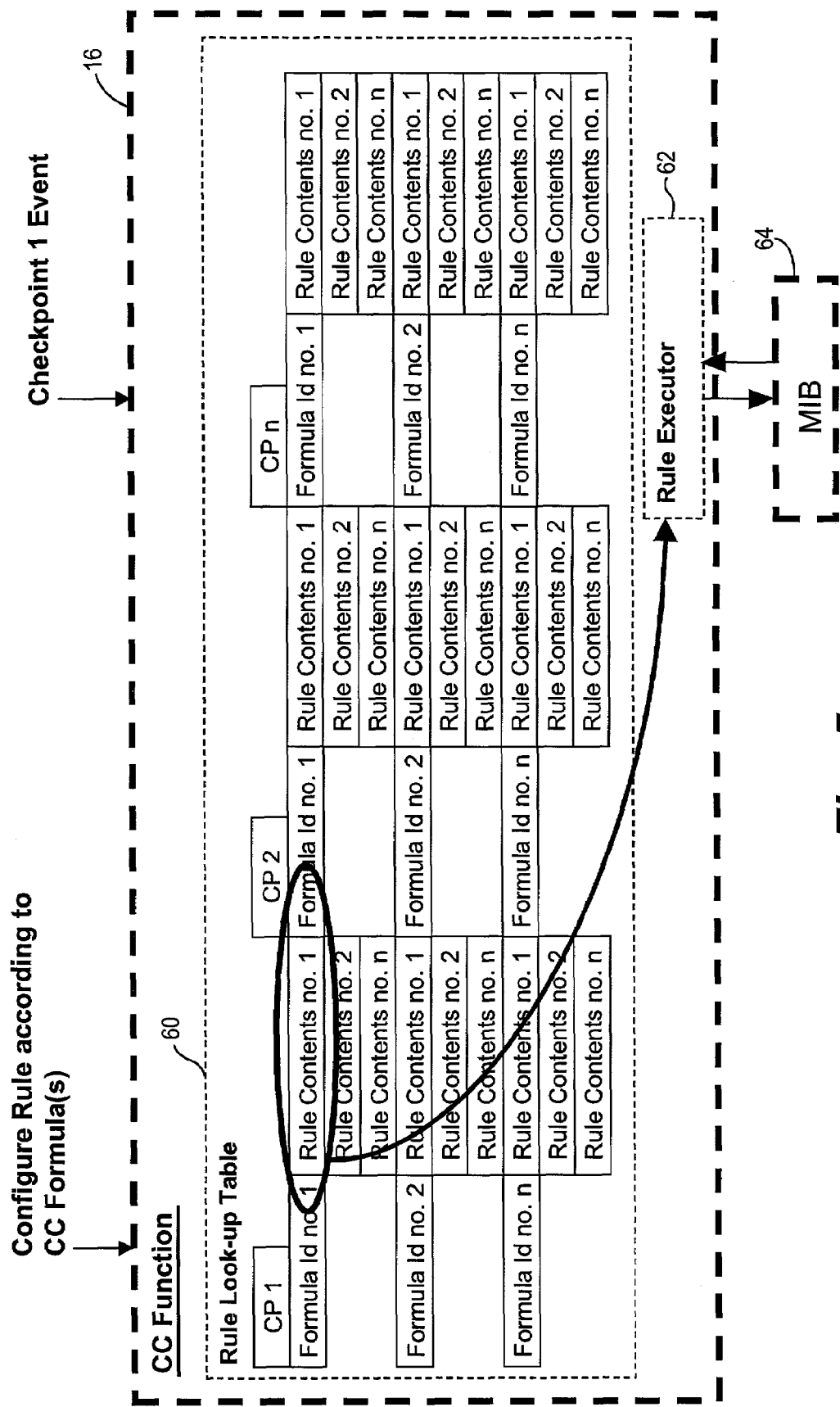
FIG. 5 illustrates a consistency check rule lookup table in accordance with one example implementation of the present invention.

FIG. 5 illustrates an example way of implementing the consistency check function in accordance with the present invention. Of course, other implementations may be used. A rule lookup table 60 is defined as part of the consistency check function 16. The rule look-up table consists of the checkpoints and formulas that have been developed by the vendor. This makes it possible to categorize and validate a consistency check rule when input by the operator. The consistency check rule contents can be stored either in a file or in persistent memory depending on the required robustness of the consistency check function. In a large application like a radio network, the consistency check rules are preferably stored in persistent memory. Whenever a checkpoint occurs, the consistency check function is notified of the event and any objects that can be delivered by the checkpoint is passed. The consistency check function then checks if any consistency check rule has been defined in any of the formulas for the relevant checkpoint. If there is a consistency check rule defined, the parameters of the rule are fetched from the storage medium and passed to the rule executor that will fetch and process the value of the attributes to be checked from the relevant configuration area. The information in the rule lookup table may be input by way of a graphical user interface or directly through an XML file. For example, in Java language, there are interfaces that can be used to fetch information from a file. Java also supports traversing an XML file. In the RANOS example, a mechanism may be generated that takes in a specific XML tag, (e.g., <checkpoint>1<checkpoint>), and stores only the value of the tag ("1" in the example).

When an event occurs which is a specified checkpoint, each consistency check rule defined by the operator for this checkpoint is executed through operations on the specified managed information base (MIB) 64 by the rule executor 62. The rule executor receives the stored consistency check rule to be performed from the rule look-up table and then fetches the actual values of the attributes to be checked from the relevant configuration area. The attribute values will be fetched through operations on the area. This may be accomplished through file operations or SQL queries depending on what medium the configuration data is stored on.

Figure 6:
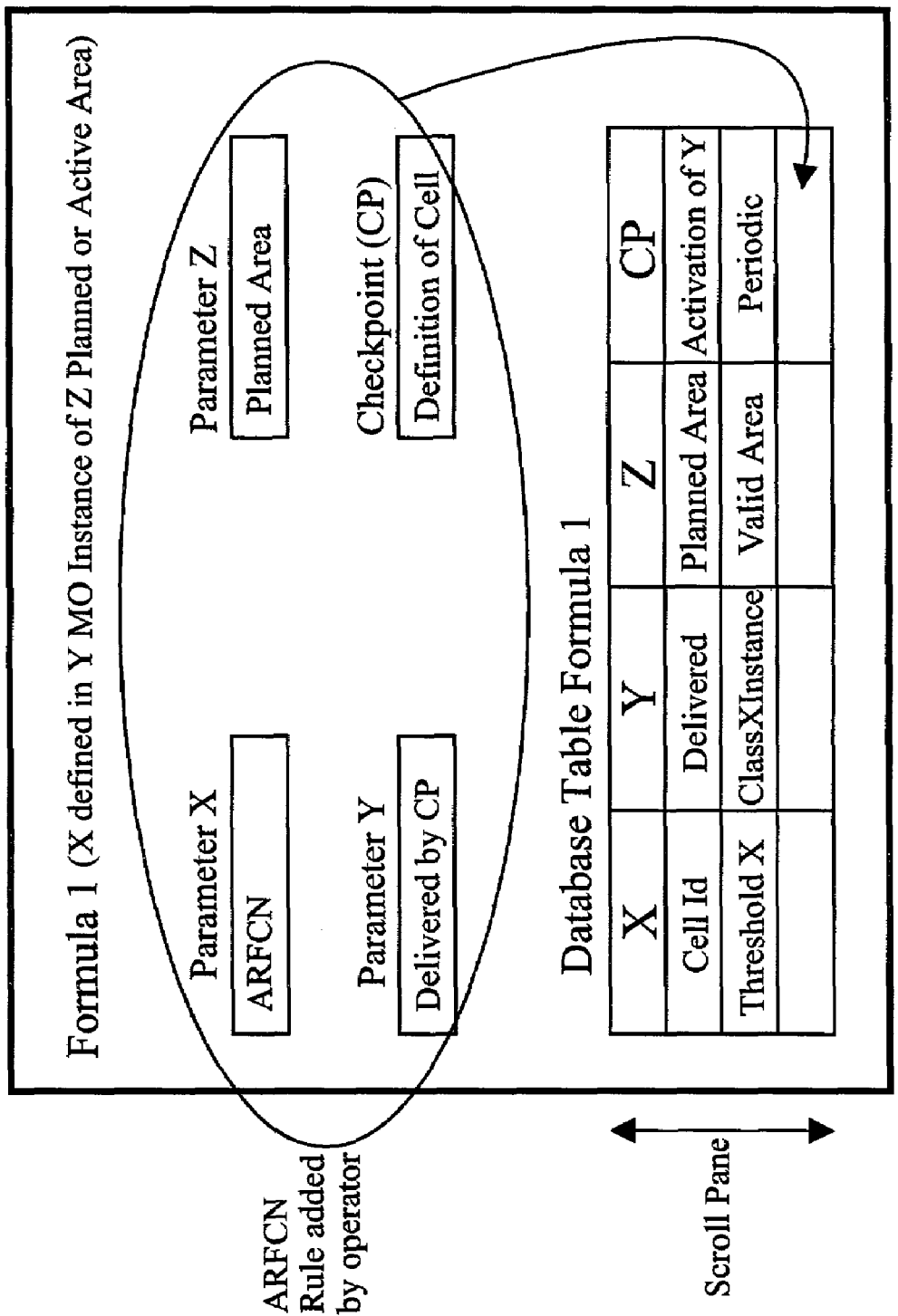
FIG. 6 illustrates an example illustration of the present invention where a network operator uses a graphical user interface to create a consistency check rule using a consistency check formula.

FIG. 6 shows an example user interface where a network operator is employing the consistency check formula 1 described above to create consistency check rules. In FIG. 6, the desired check is that of checking that an Absolute Radio Frequency Number (ARFCN) has been defined in a cell when it is created. The object in which the ARFCN attribute is checked is delivered by the checkpoint. This means that at definition of a cell (the checkpoint), a check is made that the ARFCN attribute has been set in the cell being created. Additionally, the operator has chosen to do this check when the cell is created in (populating) the planned area. Another rule also input by the operator, as can be seen in the database table of formula 1, periodically checks that the threshold X attributed of the class X instance in the valid area is defined.

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for checking consistency of data in a communications network configuration defined using managed network objects, comprising:
    providing one or more general consistency check formulas described in terms of one or more general managed objects for checking the consistency of one or more aspects of the communications network configuration, the consistency check formulas each defining a general operation performed on the one or more managed network objects;
    generating one or more consistency check rules by applying the consistency check formulas to the one or more specific managed network objects; and using the one or more consistency check rules to check the consistency of the one or more aspects of the communications network configuration,
wherein one of the consistency checking formulas is used to generate multiple consistency checking rules using different managed objects or attributes.

2. The method in claim 1, wherein the one or more consistency check rules is applied to an attribute of a managed network object.

3. The method in claim 1, wherein each consistency check formula is used to establish plural associated consistency check rules.

4. The method in claim 1, wherein each consistency check formula includes a checkpoint that defines when a corresponding consistency check rule established using the consistency check formula should be executed.

5. The method in claim 4, wherein the checkpoint includes one or more of the following: population of a planned configuration area, modification of a planned configuration area, an operator-initiated consistency check, activation of a planned configuration area, and modification of an activated configuration area.

6. The method in claim 4, wherein when a checkpoint occurs, managed object instances for the consistency check rule to be executed are provided, the method further comprising: executing the consistency check rule in response to the checkpoint occurrence.

7. The method in claim 1, wherein the consistency check formulas include one or more of the following:
Consistency check formula 1: Is [X] defined in the [Y] managed object instance of the [Z] configuration area?
where X is an attribute of the Y managed object instance, and each Y managed object instance is delivered when the checkpoint occurs in the Z planned/active configuration area;
Consistency check formula 2: Is [X] of the [Y] object instance unique within all [X] type attributes for all instances of [Y] type managed object classes of the [Z] area?
where X is an attribute of the Y managed object instance, and each Y managed object instance is provided via the checkpoint Z;
Consistency check formula 3: Is [X] of the [Y] managed object instance of the [Z] area within the [n] to [k] range?
where X is an attribute of the Y managed object instance, each Y managed object instance being delivered through the checkpoint Z, and where n is a number smaller than the number k−1; and
Consistency check formula 4: In the [X] configuration area, does [Y] have a relation to [Z],
where Y and Z are managed object instances, each object instance being delivered through the checkpoint of the X configuration area.

8. The method in claim 1, further comprising:
creating, deleting, or changing a consistency check rule using one of the consistency check formulas without performing a software upgrade.

9. The method in claim 1, further comprising:
changing a checkpoint when a consistency check rule is executed without performing a software upgrade.

10. The method in claim 1, wherein a user creates the consistency check rules by inputting certain data values for consistency check formulas by way of a user interface.

11. The method in claim 1, wherein a user creates the consistency check rules by inputting certain data values for variables by providing a data file and correlating the data file with the consistency check formulas.

12. A radio access network (RAN) management node for checking consistency of data in a RAN configuration defined using managed network objects, comprising:
a memory for storing general consistency check formulas described in terms of one or more general managed objects for checking the consistency of one or more aspects of the communications network configuration, the consistency check formulas each defining a general operation performed on the one or more managed network objects, and consistency checking software executable to:
create one or more consistency check rules by applying the consistency check formulas to the one or more specific managed network objects,
use the one or more consistency check rules to check the consistency of the one or more aspects of the communications network configuration, and
generate multiple consistency checking rules using different managed objects or attributes using one of the consistency checking formulas.

13. The RAN management node in claim 12, wherein the one or more consistency check rules is applied to an attribute of a managed network object.

14. The RAN management node in claim 12, wherein the consistency checking software is executable to establish plural associated consistency check rules using one of the consistency check formulas.

15. The RAN management node in claim 12, wherein each consistency check formula includes a checkpoint that defines when a corresponding consistency check rule created using the consistency check formula should be executed.

16. The RAN management node in claim 15, wherein the checkpoint includes one or more of the following: population of a planned configuration area, modification of a planned configuration area, an operator-initiated consistency check, activation of a planned configuration area, and modification of an activated configuration area.

17. The RAN management node in claim 15, wherein when a checkpoint occurs, the consistency checking software is executable to provide managed object instances for the consistency check rule to be executed, and thereafter, to execute the consistency check rule.

18. The RAN management node in claim 12, wherein the consistency check formulas include one or more of the following:
Consistency check formula 1: Is [X] defined in the [Y] managed object instance of the [Z] configuration area?
where X is an attribute of the Y managed object instance, and each Y managed object instance is delivered when the checkpoint occurs in the Z planned/active configuration area;
Consistency check formula 2: Is [X] of the [Y] object instance unique within all [X] type attributes for all instances of [Y] type managed object classes of the [Z] area?
where X is an attribute of the Y managed object instance, and each Y managed object instance is provided via the checkpoint Z;
Consistency check formula 3: Is [X] of the [Y] managed object instance of the [Z] area within the [n] to [k] range?
where X is an attribute of the Y managed object instance, each Y managed object instance being delivered through the checkpoint Z, and where n is a number smaller than the number k−1; and Consistency check formula 4: In the [X] configuration area, does [Y] have a relation to [Z],
where X and Z are managed object instances, each object instance being delivered through the checkpoint of the X configuration area.

19. The RAN management node in claim 12, wherein the consistency checking software is executable to create, delete, or change a consistency check rule using one of the consistency check formulas without performing a software upgrade.

20. The RAN management node in claim 12, wherein the consistency checking software is executable to change a checkpoint when a consistency check rule is executed without performing a software upgrade.

21. The RAN management node in claim 12, wherein a user creates the consistency check rules by inputting certain data values for consistency check formulas by way of a user interface.

22. The RAN management node in claim 12, wherein a user creates the consistency check rules by inputting certain data values for variables by providing a data file and correlating the data file with the consistency check formulas.

* * * * *